United States Patent
Lightstone et al.

(10) Patent No.: US 7,739,293 B2
(45) Date of Patent: Jun. 15, 2010

(54) METHOD, SYSTEM, AND PROGRAM FOR COLLECTING STATISTICS OF DATA STORED IN A DATABASE

(75) Inventors: Sam Sampson Lightstone, Toronto (CA); Ivan Popivanov, Markham (CA); Kevin R. Rose, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 964 days.

(21) Appl. No.: 10/996,197

(22) Filed: Nov. 22, 2004

(65) Prior Publication Data

US 2006/0112093 A1    May 25, 2006

(51) Int. Cl.
*G06F 7/00* (2006.01)
*G06F 17/30* (2006.01)
(52) U.S. Cl. ............................ 707/765; 707/768
(58) Field of Classification Search ............ 707/1–10, 707/100–104.1, 200–206
See application file for complete search history.

(56) References Cited

U.S. PATENT DOCUMENTS

| | | | | |
|---|---|---|---|---|
| 5,542,089 | A | 7/1996 | Lindsay et al. | 707/2 |
| 5,781,735 | A * | 7/1998 | Southard | 709/224 |
| 5,813,002 | A * | 9/1998 | Agrawal et al. | 707/5 |
| 5,870,752 | A | 2/1999 | Gibbons et al. | 707/102 |
| 5,950,185 | A | 9/1999 | Alon | 707/1 |
| 6,029,163 | A | 2/2000 | Ziauddin | 707/2 |
| 6,434,570 | B1 | 8/2002 | Rangan | 707/104.1 |
| 6,477,523 | B1 | 11/2002 | Chiang | 707/2 |
| 6,529,901 | B1 | 3/2003 | Chaudhuri et al. | 707/3 |
| 6,535,870 | B1 | 3/2003 | Friske et al. | 707/2 |
| 7,302,422 | B2 * | 11/2007 | Bossman et al. | 707/2 |
| 2002/0087518 | A1 | 7/2002 | Ellis et al. | 707/2 |
| 2002/0124001 | A1 * | 9/2002 | Chaudhuri et al. | 707/100 |
| 2004/0034643 | A1 * | 2/2004 | Bonner et al. | 707/100 |

FOREIGN PATENT DOCUMENTS

WO    WO 01/04798 A1 *   1/2001   ................... 17/30

OTHER PUBLICATIONS

IBM Technical Disclosure NB9003388.*
"Automate database upkeep with the SQL Server Maintenance Plan Wizard" (2002).*

(Continued)

*Primary Examiner*—Jean B Fleurantin
(74) *Attorney, Agent, or Firm*—Sughrue Mion, PLLC

(57) ABSTRACT

The present invention relates to collecting statistics automatically for data in a database. There is provided a method for automated statistics collection comprising determining a likelihood that statistics for data have changed; and collecting statistics for data in response to the likelihood. Indicators of the likelihood that statistics have changed may be useful to trigger automated statistics collection. Tables having statistics that change significantly may be collected more often than statistics of tables that are stable. A preferred model is provided to facilitate the collection of statistics that are more relevant: a table is scheduled for collection in accordance with observed patterns of table activity; a table is considered for collection if it meets a threshold level of activity; and a table is sampled to predict whether the statistics to be collected have changed. When collecting statistics, throttling and lock contention can minimize impact on a database user's response experience.

27 Claims, 6 Drawing Sheets

OTHER PUBLICATIONS

Denk et al., *Statistical composites: a transformation-bound representation of statistical datasets*, Jul. 24-26, 2002, IEEE, 217-226.*

Malvestuto et al., *Query evaluability in statistical databases*, Dec. 1990, IEEE, vol. 2, 425-430.*

Lightstone, S.S., et al., *Smarter DB2: IBM Puts DB2 on a Path toward Self-maintenance that Promises to Help DBAs Stay on Top of their Workloads*, DB2Magazine vol. 7, Issue 4, Quarter 4, 2002, p. 32-41.

Bauchot, et al., U.S. Appl. No. 10/835,015, *Method and System in an Electronic Data Table for Managing Order Oriented Criterias*, filed Apr. 29, 2004. Filed in EP Apr. 29, 2003, application # 033680448. All pages.

* cited by examiner

METHOD, SYSTEM, AND PROGRAM FOR COLLECTING STATISTICS OF DATA STORED IN A DATABASE

FIELD OF THE INVENTION

The invention relates to database management systems, particularly to a data processing system implemented method, a data processing system and an article of manufacture for collecting statistics associated with data stored in a database.

BACKGROUND

Many database management systems (DBMS) are configured to collect various statistics for data tables. Such statistics may be later used by a query optimizer for selecting a plan of execution for operation on the database from a plurality of plans for optimizing query access of data or for other handling of the data tables. Database administrators (DBA) often configure their databases to collect statistics using hard coded scripts run during system maintenance hours to avoid disrupting operation of the database for users. In many database management systems not having a DBA, statistics are often not collected.

In addition to DBS-controlled statistics collection, automated statistics collection is available in some DBMS. However, currently known automated operations may result in severe impact to the performance of the database. For example, automated statistics collection operations may be initiated during heavy production periods impacting user response.

Therefore a statistics collection solution that addresses at least one of these needs is desired.

SUMMARY

The present invention relates to collecting statistics automatically for data in a database. In accordance with an aspect of the invention, there is provided a method for automated statistics collection for data in a database. The method comprises determining a likelihood that statistics for the data have changed; and collecting statistics for the data in response to the likelihood. The step of determining may comprise sampling a portion of the data to generate a sample result; and comparing the sample result to statistics previously collected for the data. The likelihood is thus responsive to the comparing. The step of determining may comprise examining metadata maintained for the data whereby the likelihood is responsive to the examining. Metadata may comprise at least one of: an indicator of a change in a size of the data; an indicator of a change in a content of the data; and an indicator of a recent use of the data.

Preferably, in accordance with a feature of the method, the data is scheduled for periodic automated statistics collection and the step of determining is responsive to the scheduling. Scheduling may be modified in response to the likelihood that statistics for the data have changed or in response to a change to the statistics collected for the data.

When collecting statistics, the collecting may be throttled to reduce a consumption of resources in response to a contending need for the resources. Further, collecting statistics may comprise rejecting a resource lock for the collecting in response to a contending need for the resource lock. When the data is stored in tables formed from columns and rows, the steps of determining and collecting may be performed for individual tables.

Other aspects of the invention such as apparatus, computer system, database management system and computer readable media aspects, among others, will be apparent to those of ordinary skill in the art.

Advantageously, indicators of the likelihood that statistics have changed may be useful to trigger automated statistics collection. Tables having statistics that change significantly over time may be collected more often than statistics of tables that are stable. A preferred model is provided to facilitate the collection of statistics that are more relevant: a table is scheduled for statistics collection in accordance with observed patterns of table activity; a table is considered for collection if it meets a threshold level of activity; and a table is sampled to predict whether the statistics to be collected have changed. When all three criteria are met, automated statistics collection is indicated.

If any of the evaluated criteria (e.g. a low level of table activity or stable sample statistics) indicate a low likelihood that statistics have changed, statistics are not collected for the table and the results of the evaluations may be reflected in the observed patterns of table activity for purposes of future scheduling.

The above model seeks to minimize the number of statistic maintenance tasks by ensuring that collected statistics are very likely to have changed. An approach which only considers a level of table activity may unnecessarily collect statistics that have not changed. Indeed, if the statistics have changed, a high level of table activity must be satisfied. However, a high level of activity alone itself does not ensure that statistics have changed.

When collecting statistics, two additional methods of operation may be useful to reduce system overhead. Utility throttling may be employed to adaptively reduce the aggressiveness of the statistics collection operations and minimize impact on a database user's response experience by reducing resource consumption (e.g. processor (CPU time) and input/output resources). Lock contention avoidance, whereby all resource locks obtained by the automated statistics collection operations have a lower priority than such locks obtained for other workload operations (e.g. user initiated activity), may also be performed to lessen impact on the user experience. If lock wait or deadlock situations occur involving locks held by automated statistics collection operations, such locks are rejected and statistics collection rolled back in preference to contending needs for the resource locks.

In an aspect of the invention, there is provided a data processing system implemented method of collecting statistics associated with data stored in a database, the database operatively coupled to a data processing system, the data processing system implemented method including determining a likelihood that currently computed statistics associated with the data have changed, and collecting updated statistics for the data in response to the determined likelihood.

In another aspect of the invention, there is provided a data processing system for collecting statistics associated with data stored in a database, the database operatively coupled to the data processing system, the data processing system including a determining module for determining a likelihood that currently computed statistics associated with the data have changed, and a collecting module for collecting updated statistics for the data in response to the determined likelihood.

In another aspect of the invention, there is provided an article of manufacture for directing a data processing system to collect statistics associated with data stored in a database, the database operatively coupled to the data processing system, the article of manufacture including a program usable medium embodying one or more instructions executable by the data processing system, the one or more instructions including data processing system executable instructions for determining a likelihood that currently computed statistics associated with the data have changed, and data processing system executable instructions for collecting updated statistics for the data in response to the determined likelihood.

BRIEF DESCRIPTION OF THE DRAWINGS

The present invention will now be described in greater in reference to the figures referred to below wherein.

DETAILED DESCRIPTION

In the following description of the embodiments, reference to the accompanying drawings are by way of illustration of an example by which the invention may be practiced. It will be understood that other embodiments may be made without departing from the scope of the invention disclosed.

Figure 1:
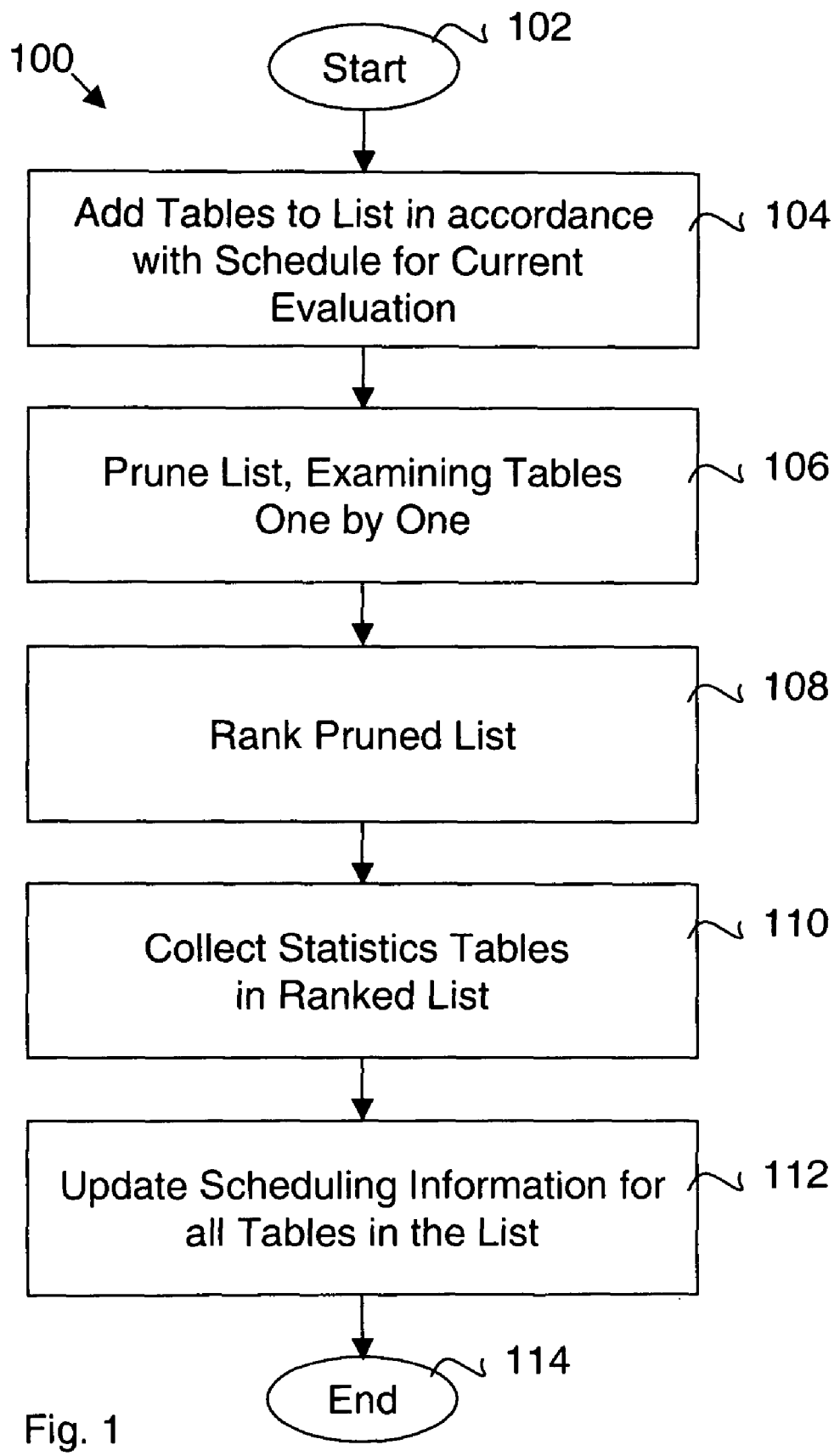
FIG. 1 is flowchart of operations for the automated collection of statistics for data in a database in accordance to an embodiment of the present invention.

The present invention will now be described with reference to FIG. 1. FIG. 1 illustrates general operations 100 for automated statistics collection in accordance with an embodiment of the invention.

In accordance with features of the present embodiment, a 3-tier model to detect tables of data (typically stored in rows and columns) in a database that require statistics collection is shown. The 3-tier model may be supplemented with scheduling and prioritizing operations for periodically considering a particular table for statistics collection and ordering the collection of statistics for those scheduled tables that indicate a likelihood that their respective statistics have change and thus need collecting.

The first tier of the model examines change activity on tables since the last time statistics the tables' respective statistics were collected. Table metadata maintained for the table such as a count of row changes (updates, deletions insertions), current and prior table size, etc. may be examined. The second tier examines table distribution changes (e.g. column histograms), for example, through sampling table data. A third tier collects statistics in an asynchronous low overhead manner, exploiting utility throttling and lock contention avoidance to minimize an impact on user experience for contending resource needs.

With reference to FIG. 1, operations 100 begin at start 102, for example, in accordance with operations for periodic automated statistics collection. At step 104, a list of tables indicated by the scheduling operations are assembled. At step 106, the list is pruned, removing those tables in response to a determined likelihood that statistics have changed and as discussed more fully with reference to FIG. 2. The tables in the pruned list are ranked to order the statistics collection (step 108) and statistics collected (step 110). At step 112, table scheduling information may be updated in response to the collected statistics. Operations end at step 114.

Figure 2:
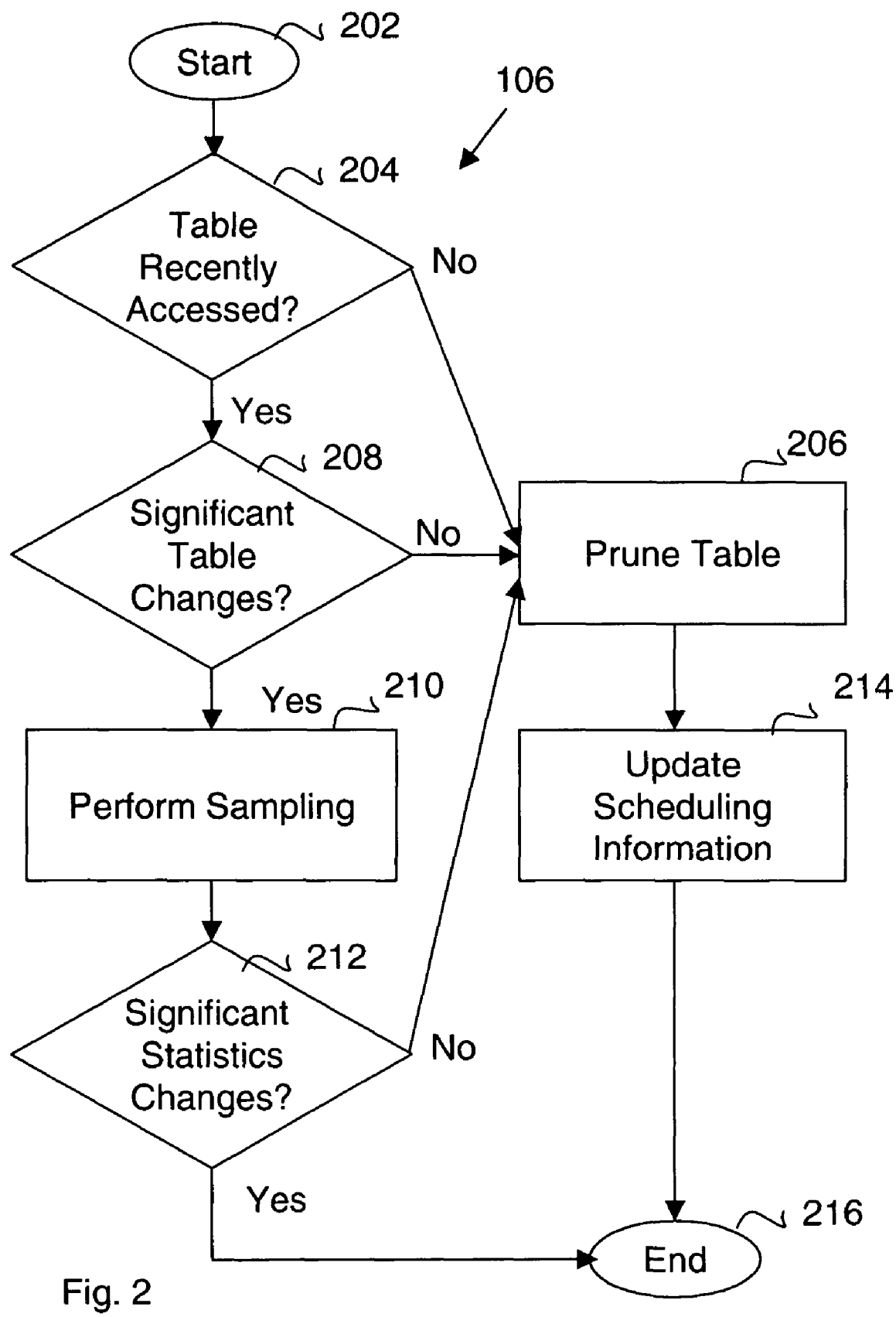
FIG. 2 is a flowchart detailing a portion of the operations shown in FIG. 1, namely operations to determine a likelihood that statistics have changed for tables scheduled for automated statistics collection.

FIG. 2 illustrates operations of step 106 of FIG. 1. From start 202, for each table in the list, an examination is made to determine whether the table has been recently used (step 204). This optional step indicates a preliminary likelihood of that statistics have changed. Recent use may be determined in a variety of manners. For example, a database management system managing the table may be examined for artefacts of recent use such as the existence of table structures in a memory of the database management system.

If the table has not been accessed recently, via No branch to step 206, operations continue to prune the table from the list, removing the table from further current collection of statistics. If the table has been accessed, via Yes branch to step 208, operations examine one or more measures of table activity (e.g. metadata for the table) with a view to determining the extent of recent activity in the form of significant changes to the table. Metadata that may be conveniently maintained for the table by a database management system or other means for monitoring table access may include a count of changes to rows of the table. Updates, insertions and deletions may be counted in response to user queries for example. The count may be normalized relative to table size. A threshold for changes may be defined (e.g. 10% of the number of table rows) to determine significant changes.

Similarly, a record of current and prior table size may be maintained to provide an indication of major table changes. If significant table changes have not occurred the table may be pruned at step 206 via No branch from step 208. If significant changes have occurred, via Yes branch to step 210, the table may be sampled to generate sampling results, for example, sample statistics similar to those defined for collection over the entire table. At step 212 the results are examined for significant changes relative to previously collected statistics for the table.

The sample statistics are compared to the table statistics, and if the two sets are found to be similar (the difference may be measured by combining several tests), then statistics collection is postponed for the table. Only when the sample and previous statistics sets are different are table statistics collected and updated for the table. Histograms collected for each column (collecting histograms is de-facto standard for all database servers) may be used for comparison purposes. However, the present invention does not put any restrictions on the methods used to decide whether the sampled and previous statistics are different or not. For example, table cardinality, the set of most frequent values could be potentially used to determine the differences.

If the sample statistics do not indicate a likelihood that the statistics have changed, via No branch to step 206, the table is pruned. Otherwise, via Yes branch to step 216, operations end and the table remains in the list for current statistics collection.

From step 206, scheduling information for the table may be updated at step 214 in response to the likelihood that statistics have not changed. This scheduling information may be used to schedule the table less frequently in accordance with operations for scheduling tables.

Figure 3:
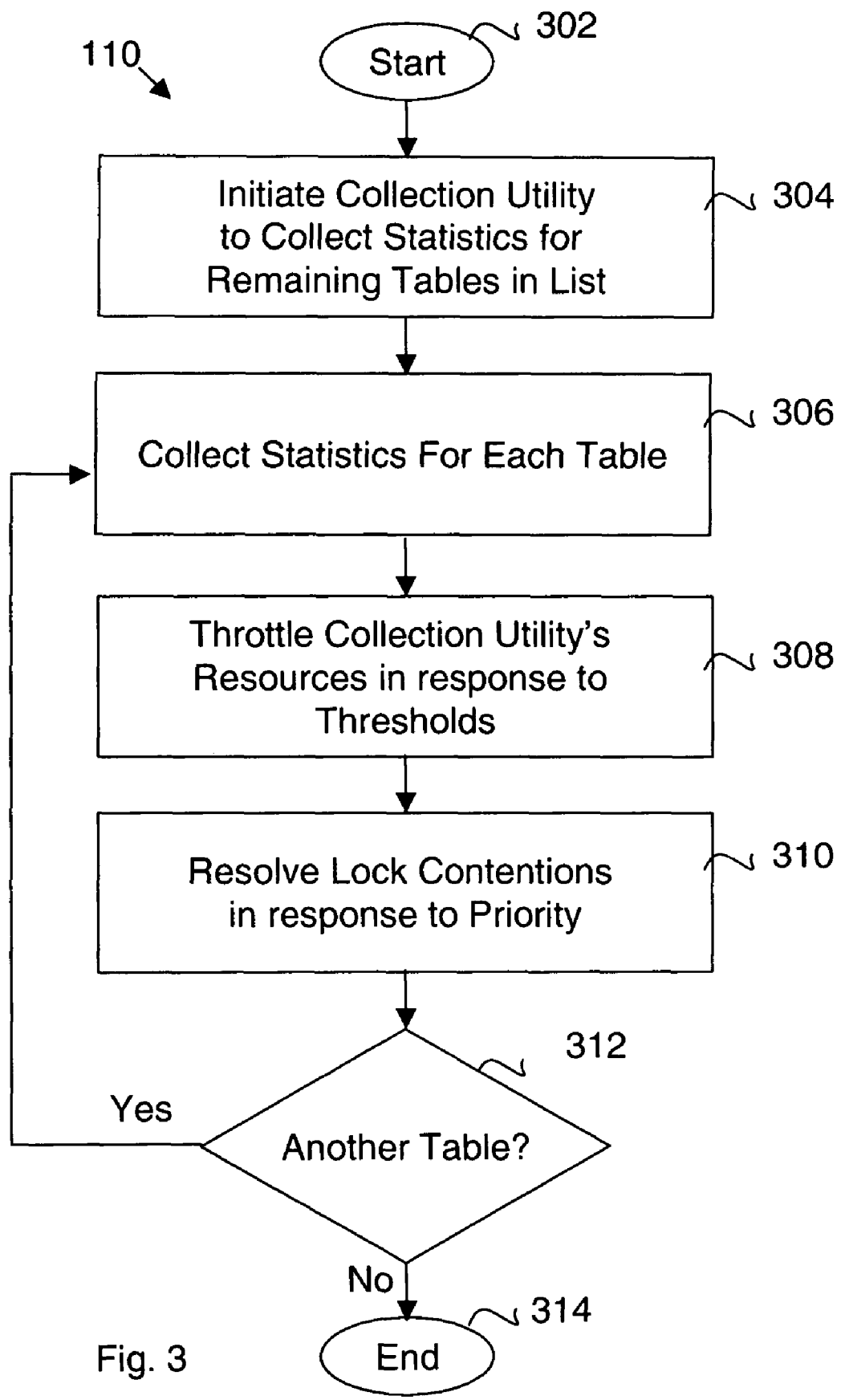
FIG. 3 is a flowchart detailing a portion of the operations shown in FIG. 1, namely operations to collect statistics, in accordance with an embodiment of the invention, for those tables indicating a likelihood of changed statistics.

FIG. 3 shows operations 110 commencing at start 302 for the collection of statistics for tables remaining in the list following a ranking of the list (step 108). A statistics collection utility is initiated at step 304. For each table in the list, the table is accessed and statistics are collected (step 306). As it executes, the collection utility will normally consume resources such as CPU time and input/output bandwidth. Performance of the production workload (i.e. user submitted queries, transactions, management utilities) typically suffers when there is resource contention with the collection utility. Therefore, it is desirable to limit the impact of the collection utility on the production workload.

A workload management system typically allows the user to partition tasks on their system so that quality of service objectives may be met. Typically this is done by controlling or limiting how the system resources are allocated amongst tasks. On a DBMS with integrated workload management capabilities with a high degree of control for specific tasks— this may involve an automated task manager always invoking the task with the lowest workload priority class. On a DBMS without workload management, this may involve using an operating system capability to lower the priority of a process/thread performing the work for the task. Yet another mechanism controls the utilities resource consumption by forcing the utility to sleep (or yield) for a portion of its time. Either mechanism can be used to limit the impact of the collection utility. The mechanism selected to limit the impact of the collection utility should not impede its progress when it is not impacting the production workload. Only restricting a utility when necessary to preserve the impact policy is often referred to as "throttling" the utility.

The configuration options will vary depending on the mechanism for limiting the impact of the collection utility. This is often referred to as a workload "policy" definition. One preferred embodiment for regulating the impact of non-production work uses a single parameter to limit how the production workload may be impacted. For example, setting an impact parameter to 10% means that the cumulative impact of background utilities on the production workload should not exceed 10%. In other words, the impact parameter defines the maximum slowdown in the workload performance a user is willing to tolerate. The advantage of this approach is simplicity—the DBA can confidently categorize tasks as either production or background with guarantees on the impact of background tasks on the production workload.

However, there may be drawbacks to a single parameter strategy since automated or autonomic utilities (such as statistics collection) or tasks may be initiated at any time. The policy for limiting the impact of background (i.e. automated or autonomic) tasks on production work may be too lenient for autonomically invoked jobs. Existing policies may have been defined by the DBA with the conscious knowledge of when the background utilities would be executed. For example, the DBA has set the policy too leniently because they know that they only explicitly execute maintenance tasks (i.e. backups, reorganizations) at night during off-peak hours. The problem is complicated because existing policies may have been defined in circumstances when automatic tasks may not have been a consideration. (i.e. An RDBMS upgrade introduces new autonomic tasks which did not exist in prior versions.) However, with autonomic utilities, a task may execute at any time—even during peak periods making the existing policy inadequate for limiting the tasks impact on the production workload. In accordance with one embodiment of the present approach, a second class of workload policies for automated jobs is used in addition to an explicitly defined user policy. If there are only automated tasks running on the system then the effective policy is the automated policy. Alternatively, the effective policy may be selected as the minimum of the explicitly defined policy and the autonomic policy. If there are non-automated tasks then the effective policy is the user-defined policy. Some DBMS implementations may elect to expose a parameter which allows the user to explicitly set how aggressively an autonomic task executes while others may choose to hide this configuration detail from the user.

At step 310, lock contention mechanisms are preferably employed to resolve contending needs for locked database objects and other resources. This mechanism may be operated to free locks held by the collection utility to respect a priority in favour of the lock needs of user-initiated operations. Preferably, incomplete collection utility operations resulting from the lock release(s) are rolled back and may be re-initiated.

At step 312, once the statistics are collected for a table, a determination may be made if a further table is in the list. If so, via Yes branch to step 306, statistics are collected for the next table. If not, via No branch to step 314, statistics collection operations 108 end.

Figure 4:
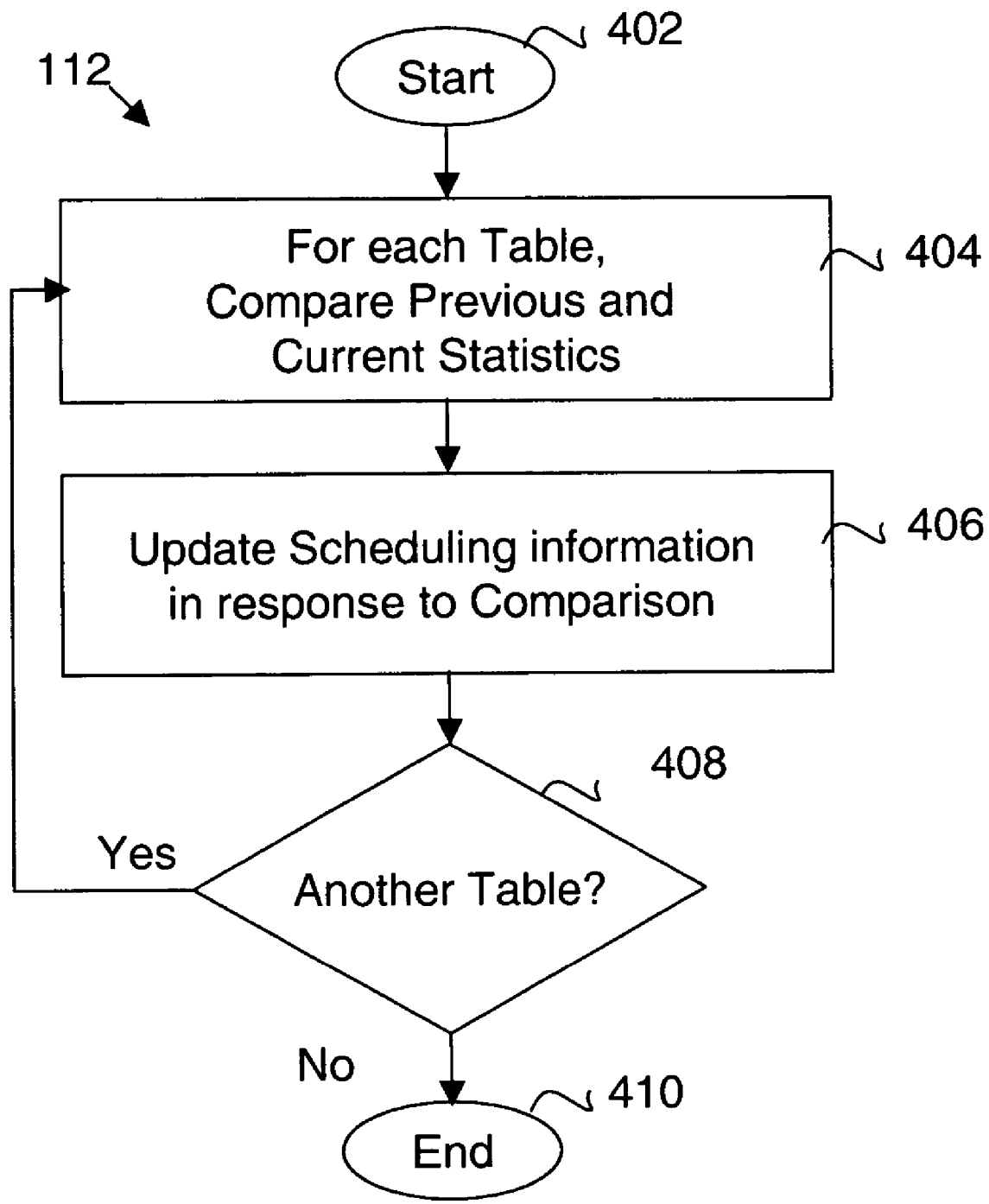
FIG. 4 is a flowchart detailing a portion of the operations shown in FIG. 1, namely operations to update scheduling information in response to the statistics collected.

At the end of the table processing, operations 112 to modify scheduling for the next check may be performed. FIG. 4 illustrates an embodiment of such operations 112. Following start 402, for each table in the list of tables for which statistics were collected (i.e. per step 110), the previous statistics for the table are compared to the current statistics (step 404). For this comparison, an implementation may use one or more of histogram comparison and column cardinalities. As mentioned above with respect to sample and previous statistics comparisons, any metric that measures the difference between the statistic sets could be utilized. At step 406, scheduling information for the table is updated in response to the comparison. A scheduler mechanism may be provide with results of the comparison for the table and operate to change its information in response. For example, input to the scheduler may be one of three states: "schedule more often", "schedule less often" and "same scheduling". As a result of the scheduler properties, statistics that change significantly over time will be collected more often than statistics that change rarely. At step 408, a determination is made whether there is a further table to examine. If so, operations loop via Yes branch to step 404. If no, operations end via No branch to step 410.

Persons of ordinary skill in the art will appreciate that the embodiment described is an example and may be modified without departing from the scope of the invention. For example, though a scheduling mechanism is described to periodically schedule tables for collection in an adaptively variable manner, tables may be selected for collection in other ways. For example, the scheduling need not be adaptive. As well tables may be pre-grouped for different periodic scheduling based on anticipated collection frequencies or limited observed behaviour. As well a step of ranking tables to order the collection of tables indicated for selection is optional. Though preferred to enhance collection for prioritized tables, situations may indicate ranking provides few or limited advantages.

When pruning a table, a step of examining table artefacts indicating recent use may be omitted. Though helpful to indicate a likelihood of high table activity, such a step may be difficult in certain implementations of a DBMS. Persons of ordinary skill in the art will appreciate that various metadata maintained for a table to indicate the extent of table activity may be used. Preferably such metadata is maintained in a low overhead and easily accessible manner that will not impact database performance. Metadata may be stored in a memory closely coupled to the database management system, for example.

Figure 5:
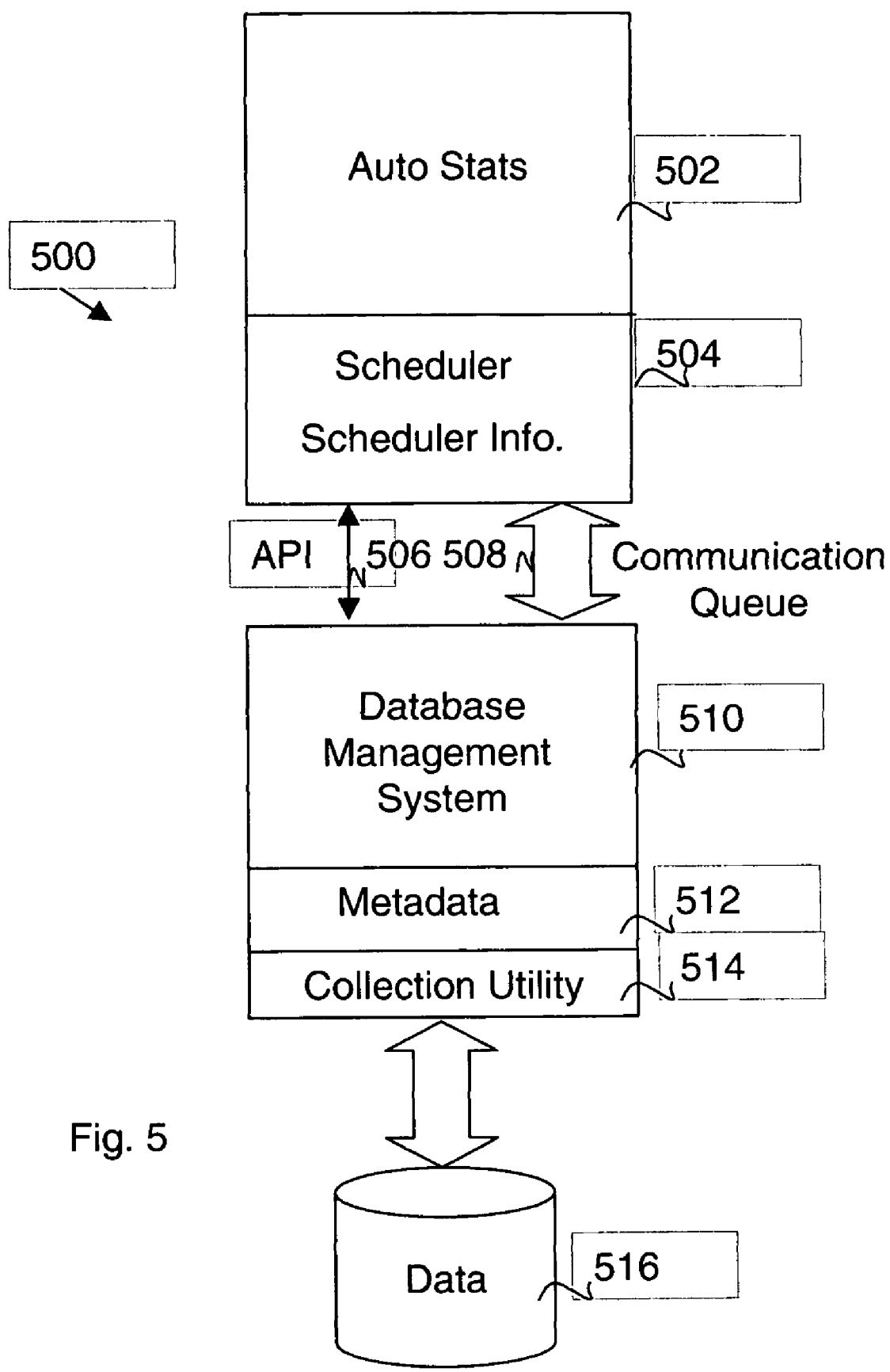
FIGS. 5 and 6 are schematic diagrams of an apparatus for the automated collection of statistics in accordance with a first and a second embodiment of the invention.
Figure 6:
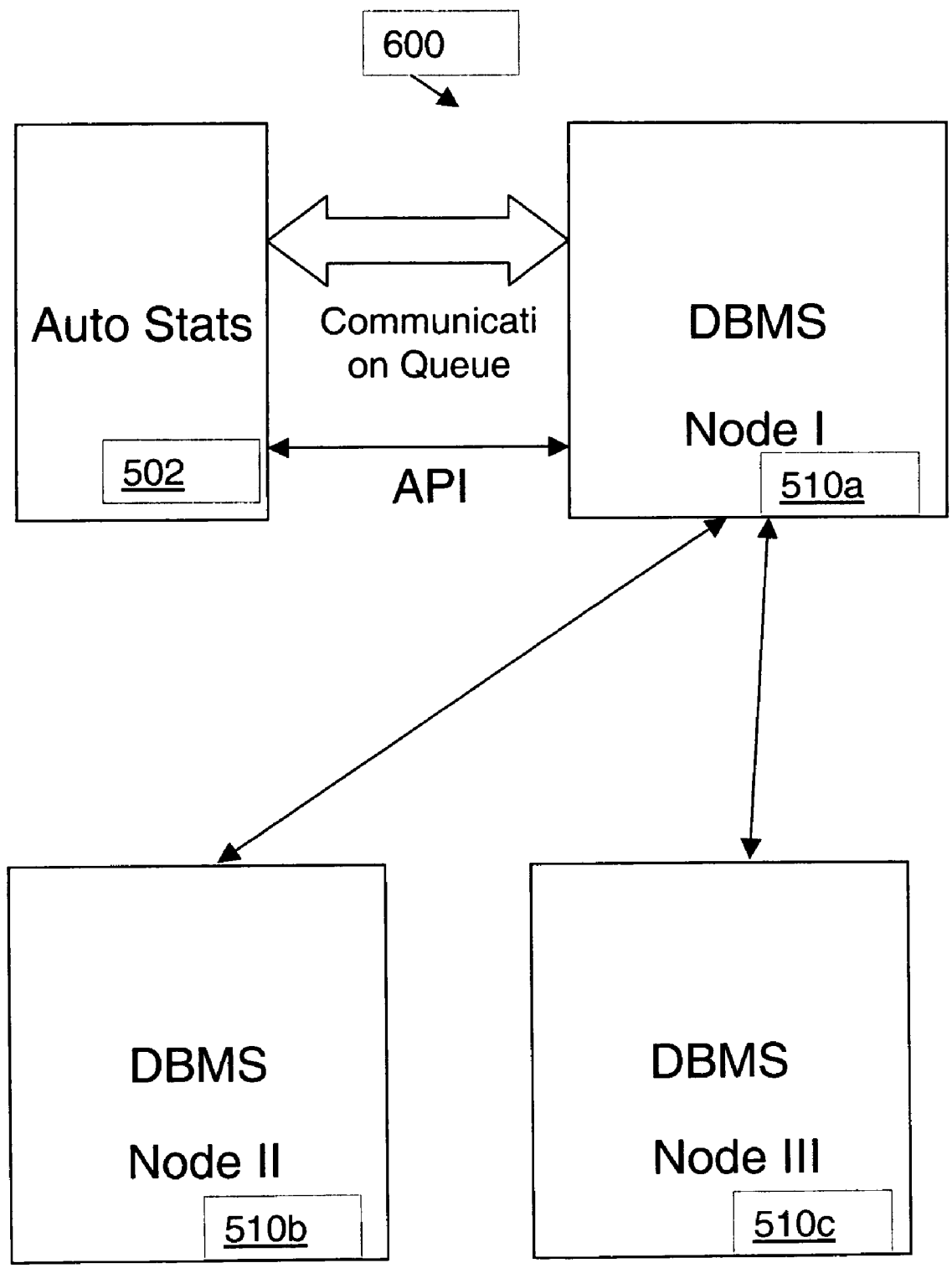

FIG. 5 illustrates a schematic diagram of an apparatus 500 for automated statistics collection for a single node database. An Auto Stats component 502 (for example program instructions and data for configuring a computer system) is coupled via an application program interface (API) 506 and communications queue (508) for operation to a database management system (DBMS) 510 operating on a single computer system. DBMS 510 is communicatively coupled to data in a database 516. Metadata 512 may be maintained by DBMS 510 and stored in a local memory. DBMS 510 may include a collection utility 514 for automatic periodic operation to collect statistics for tables of data in the database 516. Auto stats component 502 may include a scheduler having scheduler information 504 for use to control the automatic periodic operation of the collection utility as previously described. As illustrated in FIG. 6, for multiple-node database configurations 600 comprising a plurality of coupled DBMSs (e.g. 510a, 510b, 510c), a single Auto Stats component may be used. DBMS 510a may then communicate with the coupled DBMSs 510b and 510c as necessary to collect statistics for tables managed by these respective systems.

The model described herein advantageously reduces table operations to automatically collect statistics. The model provides an approach which will "learn" that although a table may experience significant table activity, its statistics may not be changing. Despite the table activity, the model will minimize the maintenance time to collect the tables statistics. Adaptively scheduling collection may further reduce maintenance time. Moreover, collection operations may be throttled and operated to prioritize non-maintenance (i.e. production) activities to enhance user experience.

The above-described embodiments of the invention are intended to be examples of the present invention, and alterations and modifications may be affected thereto, by a person of skill in the art, without departing from the scope of the invention which is defined by the claims appended hereto.

We claim:

1. A data processing system implemented method of collecting statistics associated with data stored in a database, the database operatively coupled to a data processing system, the data processing system implemented method comprising:
    assembling a list of tables of said data, said tables being scheduled for periodic automatic statistics collection;
    for each of the tables, determining a likelihood that currently computed statistics associated with the data in each of the tables have changed;
    removing from the list tables for which said determined likelihood is low;
    collecting updated statistics for the data in tables which remain in said list after said removing; and
    updating the scheduled periodic automatic statistics collection for each of the tables, said periodic automatic statistics collection comprising periodically performing subsequent collections of statistics associated with the data in each of the tables, wherein said updating comprises scheduling, for each of the tables, said subsequent collections of statistics more often or less often based on another likelihood that the updated statistics have changed for each of the tables,
    wherein said another likelihood that the updated statistics have changed is determined by comparing said updated statistics with said computed statistics.

2. The data processing system implemented method of claim 1 wherein the determining comprises:
    sampling a portion of the data to generate a sample result; and
    comparing the sample result to statistics previously collected for the data whereby said likelihood is responsive to said comparing.

3. The data processing system implemented method of claim 1 wherein the determining comprises examining metadata maintained for said data whereby said likelihood is responsive to said examining.

4. The data processing system implemented method of claim 3 wherein the metadata comprises at least one of: an indicator of a change in a size of the data; an indicator of a change in a content of the data; and an indicator of a recent use of the data.

5. The data processing system implemented method of claim 1, wherein the determining is responsive to said scheduling.

6. The data processing system implemented method of claim 5 further comprising modifying the scheduling in response to the likelihood that statistics for the data have changed.

7. The data processing system implemented method of claim 5 further comprising modifying the scheduling in response to a change to the statistics collected for the data.

8. The data processing system implemented method of claim 1 wherein the collecting of updated statistics comprises throttling the collecting, reducing a consumption of resources in response to a contending need for the resources.

9. The method of claim 8 wherein throttling comprises reducing a consumption of resources in response to a first policy determined by a user and a second policy determined by an administrator.

10. The data processing system implemented method of claim 1 wherein the collecting of updated statistics comprises rejecting a resource lock for the collecting in response to a contending need for the resource lock.

11. The data processing system implemented method of claim 1 wherein the data is stored in tables formed from columns and rows and said steps of determining and collecting are performed for individual tables.

12. The data processing system implemented method of claim 1, wherein the scheduling comprises scheduling the data for the periodic automatic statistics collection to collect the statistics more often if the determined likelihood is high and less often if the determined likelihood is low.

13. A data processing system for collecting statistics associated with data stored in a database, the database operatively coupled to the data processing system operating on a computer, the data processing system comprising:
    a processor;
    an assembling module, executed on the processor, for assembling a list of tables of said data, said tables being scheduled for periodic automatic statistics collection;
    a determining module for determining, for each of the tables, a likelihood that currently computed statistics associated with the data have changed;
    a removing module for removing from the list tables for which said determined likelihood is low;
    a collecting module for collecting updated statistics for the data in tables which remain in said list after said removing module removes tables for which said determined likelihood is low; and
    an updating module for updating the scheduled periodic automatic statistics collection for each of the tables, said periodic automatic statistics collection comprising periodically performing subsequent collections of statistics associated with the data in each of the tables, wherein said updating comprises scheduling, for each of the tables, said subsequent collections of statistics more often or less often based on another likelihood that the updated statistics have changed for each of the tables, wherein said another likelihood that the updated statistics have changed is determined by comparing said updated statistics with said computed statistics.

14. The data processing system of claim 13 further comprising a query optimizer for selecting a plan of execution for operation on the database from a plurality of plans, said query optimizer responsive to said statistics when selecting the plan.

15. The data processing system of claim 13 wherein the determining module comprises a sampling component for sampling a portion of the data, the determining module determining the likelihood that statistics for the data have changed in response to the sampling and the statistics previously collected for the data.

16. The data processing system of claim 13 further comprising a throttling mechanism for reducing consumption of a resource of said database management system in response to a contending need for the resource.

17. The data processing system of claim 13 further comprising a resource lock contention mechanism to reject a resource lock of a resource of said database management system in response to a contending need for the resource.

18. An article of manufacture for directing a data processing system to collect statistics associated with data stored in a database, the database operatively coupled to the data processing system, the article of manufacture comprising:
a program usable storage medium embodying one or more instructions executable by a processor of the data processing system, the one or more instructions comprising:
data processing system executable instructions for assembling a list of tables of said data, said tables being scheduled for periodic automatic statistics collection;
data processing system executable instructions for determining, for each of the tables, a likelihood that currently computed statistics associated with the data in each of the tables have changed;
data processing system executable instructions for removing from the list tables for which said determined likelihood is low;
data processing system executable instructions for collecting updated statistics for the data in tables which remain in said list after said removing; and
data processing system executable instructions for updating the scheduled periodic automatic statistics collection for each of the tables, said periodic automatic statistics collection comprising periodically performing subsequent collections of statistics associated with the data in each of the tables, wherein said updating comprises scheduling, for each of the tables, said subsequent collections of statistics more often or less often based on another likelihood that the updated statistics have changed for each of the tables,
wherein said another likelihood that the updated statistics have changed is determined by comparing said updated statistics with said computed statistics.

19. The article of claim 18 further comprising:
data processing system executable instructions for sampling a portion of the data to generate a sample result; and
data processing system executable instructions for comparing the sample result to statistics previously collected for the data whereby said likelihood is responsive to said comparing.

20. The article of claim 18 wherein the data processing system executable instructions for determining comprise data processing system executable instructions for examining metadata maintained for said data whereby said likelihood is responsive to said examining.

21. The article of claim 20 wherein the metadata comprises at least one of: an indicator of a change in a size of the data; an indicator of a change in a content of the data; and an indicator of a recent use of the data.

22. The article of claim 18 further comprising data processing system executable instructions for scheduling the data for periodic automated statistics collection and wherein the data processing system executable instructions for determining are responsive to said scheduling.

23. The article of claim 22 further comprising data processing system executable instructions for modifying the scheduling in response to the likelihood that statistics for the data have changed.

24. The article of claim 22 further comprising data processing system executable instructions for modifying the scheduling in response to a change to the statistics collected for the data.

25. The article of claim 18 further comprising data processing system executable instructions for throttling the collecting, reducing a consumption of resources in response to a contending need for the resources.

26. The article of claim 25 wherein the data processing system executable instructions for throttling are responsive to a first policy determined by a user and a second policy determined by an administrator for reducing the consumption of resources.

27. The article of claim 18 further comprising data processing system executable instructions for rejecting a resource lock for the collecting in response to a contending need for the resource lock.

* * * * *